United States Patent
Adelmann (10) Patent No.: US 7,215,633 B2
(45) Date of Patent: May 8, 2007

(54) STORAGE DEVICE HAVING A PROBE WITH A TIP TO FORM A GROOVE IN A STORAGE MEDIUM

(75) Inventor: Todd C. Adelmann, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 561 days.

(21) Appl. No.: 10/640,393

(22) Filed: Aug. 13, 2003

(65) Prior Publication Data

US 2005/0036428 A1    Feb. 17, 2005

(51) Int. Cl.
 *G11B 11/16* (2006.01)
(52) U.S. Cl. .................................... 369/126; 369/13.56
(58) Field of Classification Search ................ 369/154
 See application file for complete search history.

(56) References Cited

U.S. PATENT DOCUMENTS

| | | | |
|---|---|---|---|
| 5,132,934 A * | 7/1992 | Quate et al. ................ 369/126 |
| 5,345,815 A | 9/1994 | Albrecht et al. |
| 5,835,477 A * | 11/1998 | Binnig et al. ............... 369/126 |
| 5,856,967 A * | 1/1999 | Mamin et al. ............... 369/126 |
| 6,233,206 B1 | 5/2001 | Hamann et al. |
| 6,370,107 B1 * | 4/2002 | Hosaka et al. ........... 369/275.4 |
| 6,473,361 B1 | 10/2002 | Chen et al. |
| 2002/0066855 A1 * | 6/2002 | Choi et al. ................... 250/234 |
| 2002/0168825 A1 * | 11/2002 | Kim et al. ................... 438/287 |
| 2004/0047275 A1 * | 3/2004 | Cherubini et al. .......... 369/126 |
| 2004/0113641 A1 | 6/2004 | Birecki |
| 2004/0218507 A1 * | 11/2004 | Binnig et al. ................ 369/154 |

OTHER PUBLICATIONS

Vettiger, P., et al; The 'Millipede'—Nanotechnology Entering Data Storage; IEEE Transactions on Nanotechnology, vol. 1, No. 1, Mar. 2002; p. 39-55.
Vettiger and Binnig, Scientific American, "The Nanodrive Project," pp. 47-51, 53 (Jan. 2003).

* cited by examiner

*Primary Examiner*—Wayne Young
*Assistant Examiner*—Lixi Chow (57) ABSTRACT

A storage device comprises a probe having a tip. The storage device also comprises a storage medium, with the tip of the probe to form the groove in the storage medium. The probe tip interacts with a surface of the groove to store and read data.

15 Claims, 5 Drawing Sheets

STORAGE DEVICE HAVING A PROBE WITH A TIP TO FORM A GROOVE IN A STORAGE MEDIUM

BACKGROUND

In computing systems, such as desktop computers, portable computers, personal digital assistants (PDAs), servers, and others, storage devices are used to store data and program instructions. One type of storage device is a disk-based device, such as magnetic disk drives (e.g., floppy disk drives or hard disk drives) and optical disk drives (e.g., CD or DVD drives). Such disk-based storage devices have a rotating storage medium with a relatively large storage capacity. However, disk-based storage devices offer relatively slow read-write speeds when compared to operating speeds of other components of a computing system, such as microprocessors and other semiconductor devices.

Another type of storage device is a solid state memory device, such as a dynamic random access memory (DRAM), static random access memory (SRAM), flash memory, and electrically erasable and programmable read-only memory (EEPROM). Although solid state memory devices offer relatively high read-write speeds, usually on the order of nanoseconds, they have relatively limited storage capacities.

With improvements in nanotechnology (technology involving microscopic moving parts), other types of storage devices are being developed. One such storage device is based on atomic force microscopy (AFM), in which one or more microscopic scanning probes are used to read and write to a storage medium. Typically, a scanning probe has a tip that is contacted to a surface of the storage medium. Storage of data in the storage medium is based on perturbations created by the tip of the probe in the surface of the storage medium. In one implementation, a perturbation is a dent in the storage medium surface, with a dent representing a logical "1," and the lack of a dent representing a logical "0." Other types of perturbations that can be created in the surface of the storage medium include creating or altering the topographic features or composition of the storage medium, altering the crystalline phase of the medium, filling or emptying existing electronic states of the medium, creating or altering domain structures or polarization states in the medium, creating or altering chemical bonds in the medium, employing the tunneling effects to move and remove atoms or charge to or from the medium, or storing/removing charge from a particular region.

Typically, for improved access speeds, multiple probes are used, with the multiple probes usually arranged in an array. The array of probes are scanned across the surface of a storage medium to detect for the presence or absence of perturbations to determine the states of corresponding bits of data. In storage devices that use dents to store data bits, the dents are formed by heating the probe tips and applying a downward force on the probes such that the dents are imprinted into the storage surface of the storage medium. For accurate operation, the probe array and the storage medium have to be aligned with respect to each other. Temperature changes and variations between the probe array and the storage medium may cause mis-alignment between previously recorded dents and the probes. For example, the probe array may have a different coefficient of thermal expansion than the storage medium. Thus, once heated, mis-alignment may cause some of the probes in the array to go off track. If this occurs, perturbations in the surface of the storage medium may be missed, which may cause the probes to erroneously detect that perturbations are not present. As a result, read errors may occur, which reduces reliability of storage device operation.

DETAILED DESCRIPTION

Figure 1:
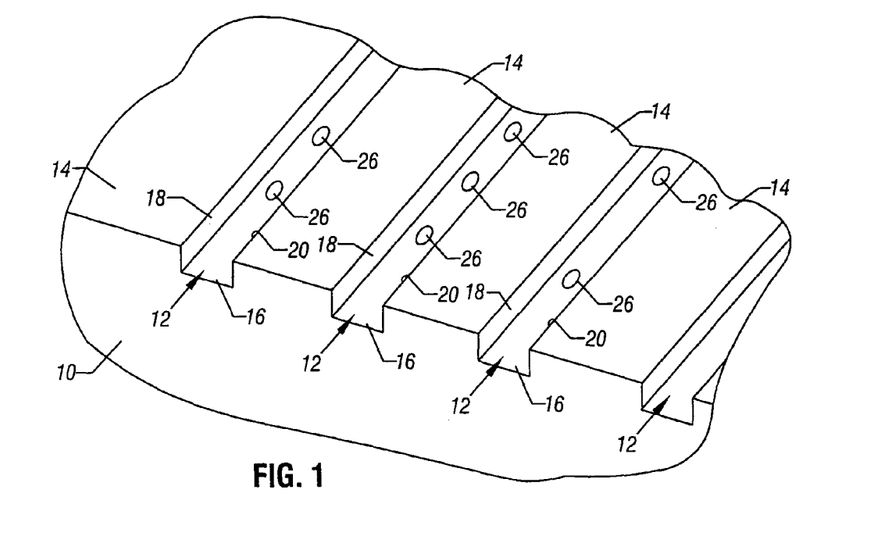
FIG. 1 illustrates a portion of a probe-based storage device that includes a storage substrate defining a storage medium and perturbations created along tracks in the storage medium.

FIG. 1 shows a storage substrate 10 providing a storage medium of an example probe-based storage device. The storage medium has multiple tracks 12 formed into surface 14 of the storage medium, with the tracks 12 running generally in parallel to each other along the storage substrate 10. Each track 12 is generally a groove that has a bottom surface 16 and sidewalls 18 and 20. In the embodiment shown in FIG. 1, the sidewalls 18 and 20 are each generally at a right angle with respect to the bottom surface 16 of the groove. In alternative embodiments, a more curved or angled arrangement of the sidewalls 18 and 20 with respect to the bottom surface 16 is provided.

Figure 2:
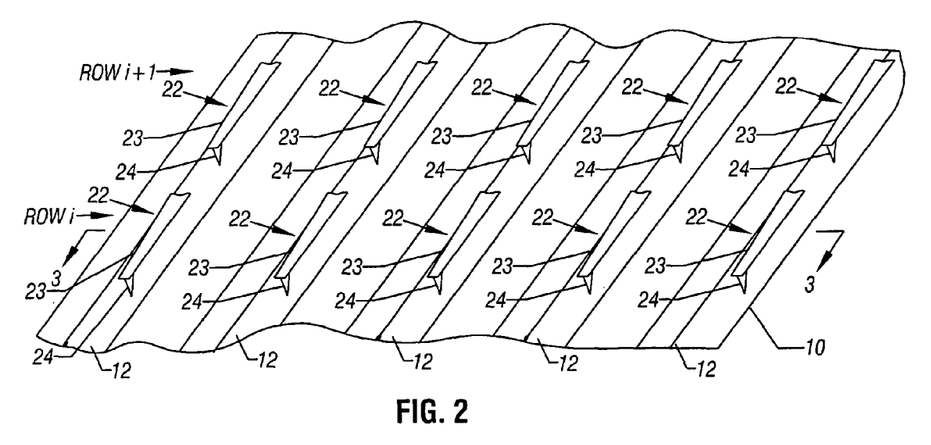
FIG. 2 is a slightly different view of a portion of the probe-based storage device including the storage medium with tracks and respective probes that scan along the tracks.

Referring also to FIG. 2, a plurality of probes 22 are arranged over respective tracks 12 in the storage substrate 10. Each probe 22 has a tip 24, with the probe 22 having a cantilever 23. The tip 24 is attached to and extends outwardly from the cantilever 23. According to some embodiments, each probe 22 is a very small probe (on the order of micrometers, nanometers, or even smaller) that is built using nanotechnology techniques. The probes 22 are formed from a probe substrate that is positioned in a plane that is generally parallel to the storage substrate 10. The tip of each probe 22 protrudes from a main surface of the probe substrate to enable the tip to contact the bottom surface 16 of a respective track 12.

In FIG. 2, an array of probes 22 is shown, with the array having multiple rows (row i and row i+1 shown) of probes. Each row of probes 22 is arranged such that the probes 22 are able to scan along respective tracks 12. The array also includes multiple columns of probes, with a column of probes running generally along one track 12. In alternative embodiments, instead of multiple rows of probes 22, a single row of probes 22 is provided.

As shown in FIG. 1, perturbations 26 are formed in the bottom surface 16 of each track 12 in the storage medium. In one embodiment, the perturbations 26 are dents, pits, indentations, or markings formed in the bottom surface 16. In this embodiment, the material making up the storage medium is formed of a relatively soft material, such as polymer (e.g., PMMA or polymethylmethacrylate). In other embodiments, the material making up the storage medium can be a liquid crystal, a phase change material, or any other suitable material.

To create the dents 26, the tip 24 of each probe is locally heated to a predetermined temperature (e.g., up to about 400° C.) for some amount of time. The heat from the tip melts the storage medium at the contact points of the tip 24. When a downward force is applied to the probe 22, the tip 24 engages and imprints a dent 26 into the bottom surface 18. The probe tip 24 thus interacts with the bottom surface 16 of each groove to store data.

The applied downward force can be an incremental, applied downward force, or alternatively, a constant downward force due to the elastic nature of each cantilever. For example, the device is assembled such that the cantilevers are bent back a little and are always applying some pressure on the storage substrate.

The bottom surface 16 in each track 12 effectively provides a storage surface of the storage medium into which dents (or other perturbations) can be formed to represent states of data bits. The bottom surface 16 of each track 12 does not have to be completely flat. Rather, the bottom surface 16 may be a non-flat surface, such as a curved surface, a generally V-shaped surface, or any surface in which perturbations can be formed.

The presence of a dent represents a logical "1," while the absence of a dent represents logical "0." The multiple dents 26 shown in FIG. 1 represent dents formed in respective storage cells, with each storage cell representing a bit of data.

Once dents are formed, they can be erased by using the tip 24 of the probe 22. During erase, the tip 24 engages the dent 26, with the tip being heated locally to melt the material surrounding the dent 26 such that the material flows into the dent to fill in and thus remove the dent.

Heating of the tip 24 can be achieved in one of several ways. For example, an electrical pulse can be sent along a conductor through the cantilever 23 of the probe 22 to the tip 24, which causes the tip 24 to be heated to the desired temperature. The heating can be achieved by local heating elements such as resistors (which heat up in response to current passing through the resistors). Alternatively, laser beams or other heat sources can be used to perform heating.

Instead of dents formed in a storage cell by the tip 24 of the probe 22, other types of redundant perturbations can be created in each storage cell. Perturbations can include, but are not limited to, the following: creating or altering the composition of a storage medium; altering the crystalline phase of the medium; filling or emptying existing electronic states of the medium; creating, or altering domain structures or polarization states in the medium; creating or altering chemical bonds in the medium; employing tunneling effects to move or remove atoms or charge to or from the medium; or storing/removing charge from a particular region.

Figure 3:
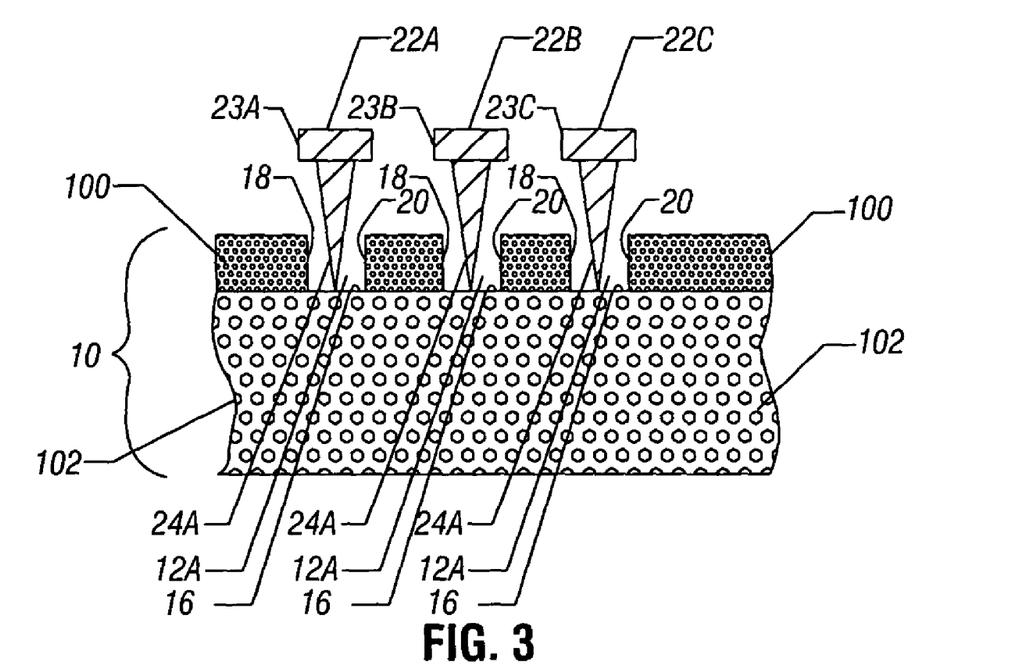
FIG. 3 is a cross-sectional view of the storage device of claim 2, which shows the tips of probes engaged in respective tracks.

FIG. 3 shows a cross-sectional view of the storage substrate 10 and probes 22 (22A, 22B, 22C shown). In the implementation shown in FIG. 3, the storage substrate 10 includes at least two layers 100 and 102. The first layer 100 is formed over the second layer 102. In one example embodiment, the layer 100 is formed of a first material, and the layer 102 is formed of a second material, with the first material having a melting temperature that is different from the melting temperature of the second material. In another embodiment, the same material is used to form the first and second layers, except the material in the two layers are treated differently to provided different melting temperatures. In one implementation, the melting temperature of the first layer 100 is higher than the melting temperature of the second layer 102. To provide the different melting temperatures of the first and second layers 100 and 102, the two layers 100 and 102 may be formed of different polymers, according to one implementation. Additionally, in some implementations, the second layer 102 may be another layer that is formed over the main supporting structure of the substrate 10, which can be formed of yet another type of material.

Each groove making up a track 12 (12A, 12B, 12C shown in FIG. 3) extends entirely through the first layer 100 to the second layer 102. Although the bottom surface 16 of each track 12 is shown to be in the contact plane between the first layer 100 and 102, the track may actually extend into a portion of the second layer 102.

Figure 4:
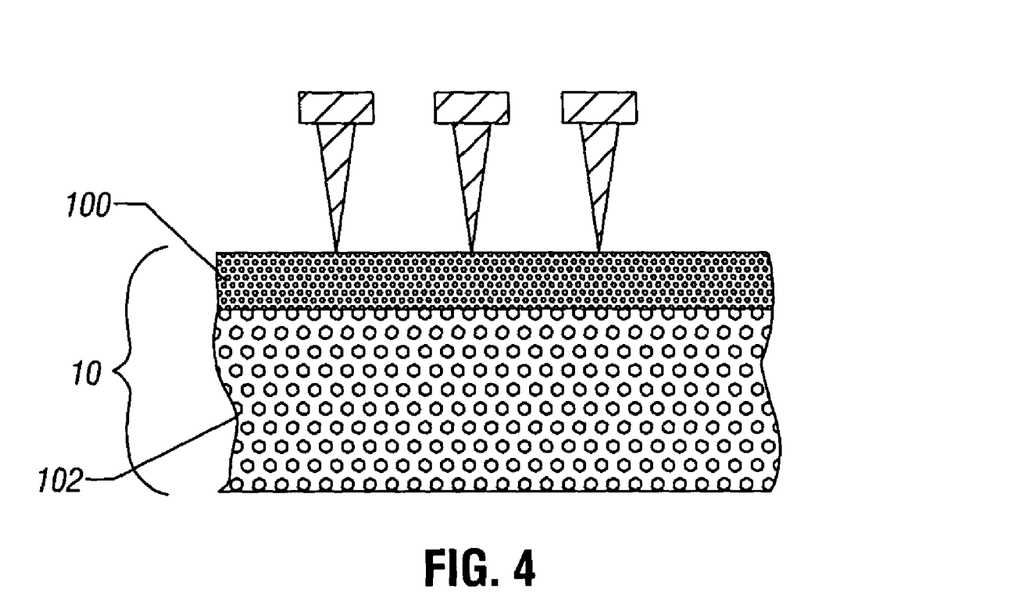
FIG. 4 is a cross-sectional view of the storage device of claim 2, which shows the tips of probes engaged to an upper surface of the storage medium prior to formation of the tracks.

According to some embodiments of the invention, the tracks 12 are formed by the tips 24 of respective probes 22. In the example shown in FIG. 3, three probes 22A, 22B, and 22C are shown engaged in respective grooves 12A, 12B, and 12C, which were formed by the tips 24A, 24B, and 24C, respectively. As shown in FIG. 4, during manufacture of the probe-based storage device, the layer 100 is formed to cover the second layer 102. The probe tips 24A, 24B and 24C are then engaged to the upper surface 104 of the first layer 100 at locations where the grooves 12A, 12B, and 12C are to be created. Once positioned, the tips 24A, 24B, and 24C are heated to a predetermined temperature, which is higher than the temperature used to form dents 26 in the storage medium (the write temperature). The increased temperature of the tips 24A, 24B, and 24C is greater than the melting temperature of the first layer 110 to cause the first layer 100 to melt near the contact points of the tips 24A, 24B, and 24C. The probes 22A, 22B, and 22C are then moved to scan along the dimension of the first layer 100 in which the grooves are to be formed. While scanning the probes, a downward force is applied to enable the tips 24A, 24B, and 24C to deflect sufficiently into the first layer 100 to form the grooves making up the grooves 12A, 12B, and 12C. The downward deflection of the tips is sufficient to cause the tips 24A, 24B, and 24C to extend all the way through the first layer 100 to form the grooves. The desired length of the grooves is formed based on the scan length of the probes.

A benefit of using the probes 22 themselves to create the tracks 12 is that improved alignment between the probes 22 and the tracks 12 can be achieved. Since it is the probes of the storage device that create the tracks in the storage medium, instead of an external track-forming device, optimal alignment can be achieved between the probes 22 and the tracks 12. A self-aligning feature of the probes 22 and the tracks 12 is thus provided. During operation, mis-alignment between the probes 22 and the tracks 12 due to temperature variations is reduced. Also, because the tracks 12 are formed after assembly of the storage device, unrealistic tolerances to achieve alignment of the probes and tracks can be avoided. In addition, any unique characteristics of the probes 22 are accounted for by using the probe to form the tracks.

As noted above, the tracks are formed by the probes during manufacture of the storage device. In an alternative embodiment, instead of forming the tracks with the probes during manufacture, the storage devices can actually be sold by a manufacturer to users without first forming the tracks. Such tracks can then be formed during operation of the storage device.

According to one embodiment, the melting temperature of the first layer 100 is higher than the melting temperature of the second layer 102. This difference in melting points avoids melting the first layer 100 (and thus the sidewalls 18 and 20 of each track 12) during normal operation. During a write or erase operation, the tip 24 of a probe 22 is heated to the write temperature to create the dent. The write temperature is less than the melting temperature of the first layer 100, but greater than the melting temperature of the second layer 102.

The probe tips 24 are kept in respective tracks 12 due to the inherent flexibility of the tips and cantilevers. Additional flexibility may be added to the tips 24 by using flexible elements (such as springs made using nanotechnology techniques) to attach the tips to the respective cantilevers 23 of the probes 22. If further flexibility is desired to accommodate expansion or contraction due to heat variation, the probe array can be manufactured such that flexures are built into the probes. This embodiment allows more mechanical variation and stress to be relieved across the entire plane of the probe array. Small blocks of probes on the probe array would still be physically connected but have flexures in between such that the lateral force the tracks place on the probes can be accommodated.

Figure 5:
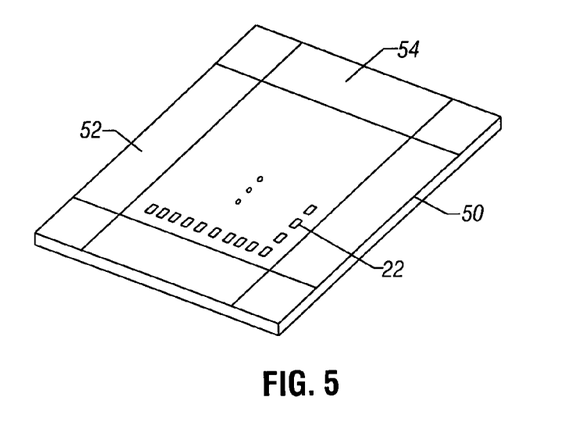
FIG. 5 is a schematic diagram of a probe substrate containing an array of probes and peripheral circuitry to interact with the probes.

FIG. 5 illustrates the probe substrate 50, which includes an array of probes 22 formed in the substrate 50. Peripheral circuitry 52 and 54 are provided on the peripheral sides of the probe substrate 50. For example, peripheral circuitry 52 and 54 can drive X and Y select lines to select bits of the storage array to read from or write to. A row of probes 22 may be activated by the select lines to read from or write to storage cells that the probes are in contact with. This embodiment enables concurrent access of multiple cells in one operation, which improves access speeds. Alternatively, one of the probes may be activated to read from or write to a storage cell. The peripheral circuitry 52 and 54 also include sensing devices and decoders to detect analog signals from the probes and to convert the analog signals to a digital representation of a logical "0" or a logical "1."

Figure 6:
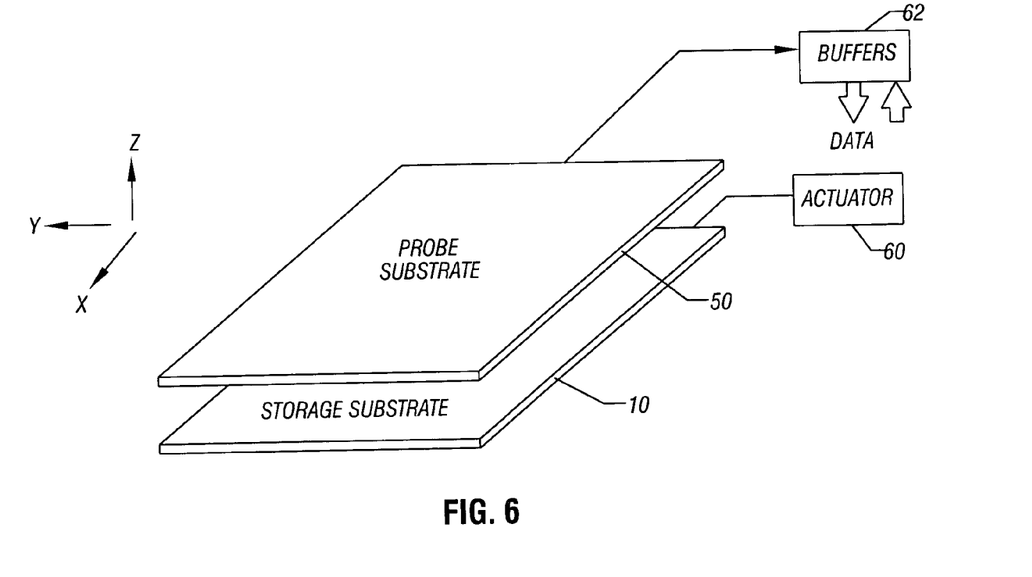
FIG. 6 illustrates a probe substrate positioned to face the storage substrate in the probe-based storage device of FIG. 1.

As further shown in FIG. 6, the probe substrate 50 is placed over the storage substrate 10 such that the probes 22 (FIG. 5) formed in the probe substrate 50 face the storage surface of the storage medium. In this arrangement, the probe tip 24 (FIG. 2) of each probe points downwardly to engage the storage surface (bottom surface 16 of the track 12 shown in FIG. 1) of the storage medium. In an alternative arrangement, the storage substrate 10 is positioned over the probe substrate 50 so that the probe tip 24 points upwardly to face the storage surface of the storage medium. In other arrangements, the probe substrate 50 and the storage substrate 10 can be positioned laterally or diagonally.

The storage substrate 10, in the example of FIG. 6, is coupled to an actuator 60 that is designed to move the storage substrate 10 in both X and Y directions such that the probes 22 (FIG. 2) can be placed over desired storage cells on the storage medium. Data sensed by the probe substrate 50 is provided to buffers 62, which store output data for retrieval by an external device. The buffers 62 may also contain write data to be written to storage cells in the storage substrate.

Alternatively, the actuator 60 is operatively coupled to move the probe substrate 50, or to move both the probe substrate 50 and the storage substrate 10. The actuator 60 is also able to move the storage substrate 10 and/or the probe substrate 50 in the Z direction, which is generally perpendicular to both the X and Y directions.

Figure 7:
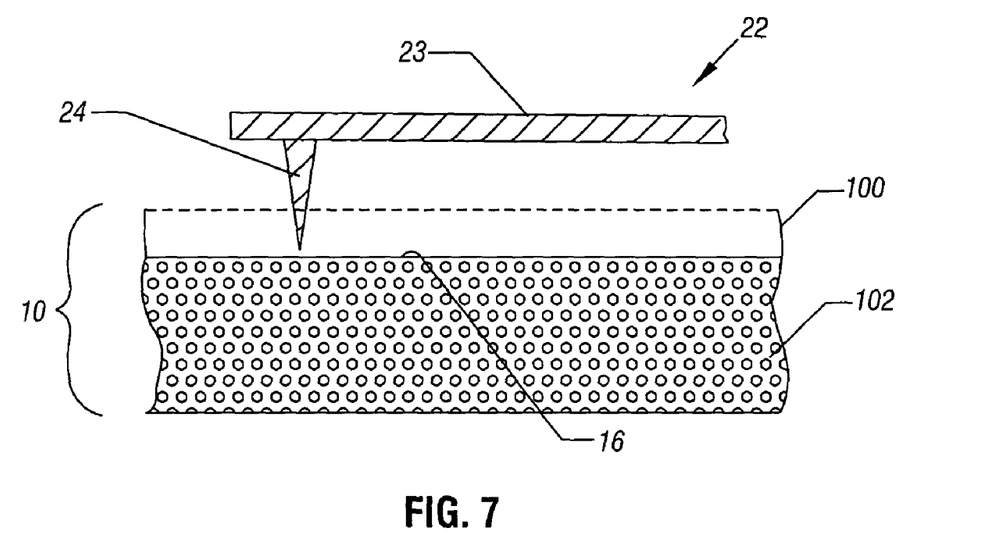
FIG. 7 illustrates the tip of a probe in contact with a surface of the storage medium.
Figure 8:
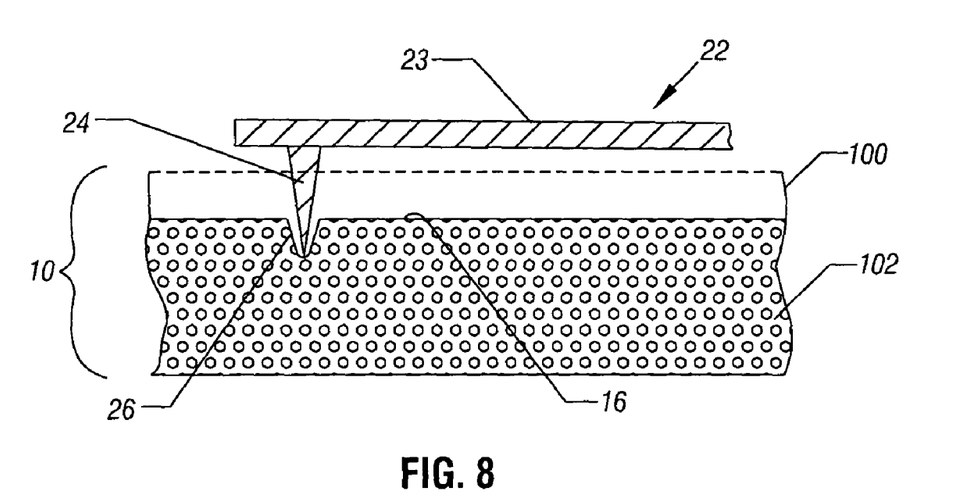
FIG. 8 illustrates creation of a perturbation in the surface of the storage medium with the tip of the probe.

FIG. 7 is a side view of the tip 24 of the probe 22 in contact with the bottom surface 16 of a track 12. This position enables the probe 22 to write to a storage cell. As shown in FIG. 8, heating at the tip 24 and downward pressure applied to the cantilever 23 of the probe 22 causes a dent 26 to be formed in the bottom surface 16 of the track 12. To read from a storage cell, the tip 24 of the probe 22 is scanned across the bottom surface 16 of a track 12. As the probe tip 24 is dragged across the bottom surface 16, the probe tip will deflect into the dent 26 as it crosses the dent. Detection of the dent in the storage cell is an indication of a logical "1".

In one implementation, during a read operation, the probe tip 24 is heated to a temperature that is lower than the write temperature. When the heated probe tip encounters a dent, the probe tip transfers heat to the material of the bottom surface 16 and electrical resistance falls. This reduction in electrical resistance is detected by peripheral circuitry 52 and 54 (FIG. 5). In an alternative implementation, detection of the engagement of the probe tip 24 in the dent 26 is based on measurement of the deflection of the cantilever 23 in response to the probe tip engaging the dent. The detection of the cantilever deflection is performed by a piezoresistive resistor that has a resistance that varies with deflection of the cantilever 23. The piezoresistive resistor can be provided at the fixed base of the cantilever 23.

Figure 9:
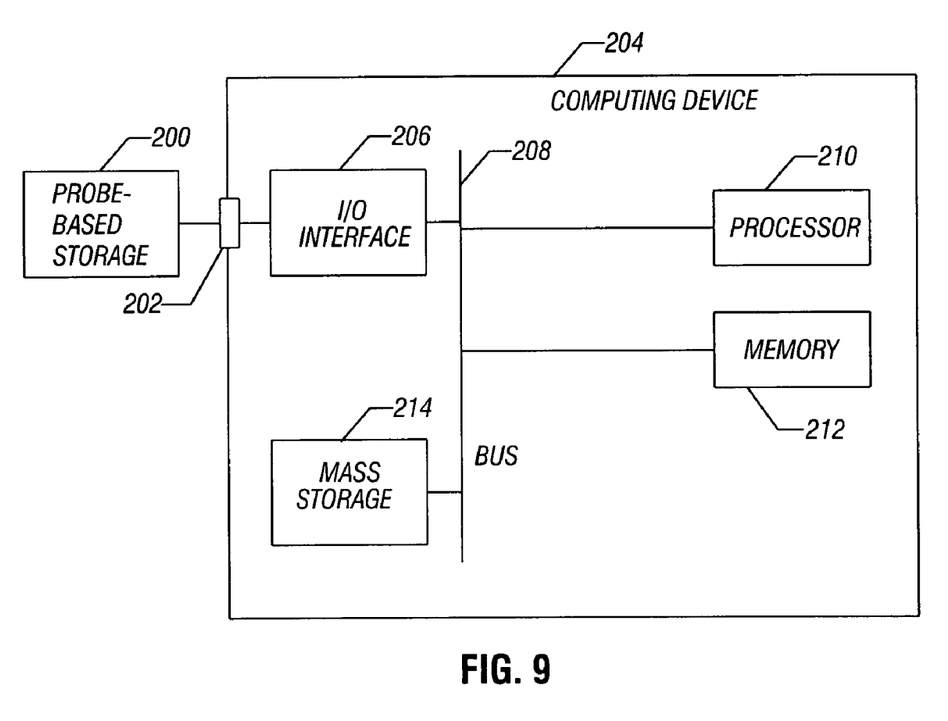
FIG. 9 is a block diagram of a system that includes a computing device having a port to connect to a probe-based storage device.

The probe-based storage device can be packaged and used with computing systems. For example, as shown in FIG. 9, a probe-based storage device 200 as discussed above is attached or connected to an I/O (input/output) port 202 of a computing device 204. The I/O port 202 can be a USB port, a parallel port, or any other type of I/O port. Inside the computing device 204, the I/O port 202 is connected to an I/O interface 206, which in turn is coupled to a bus 208. The bus 208 is coupled to a processor 210 and memory 212, as well as to mass storage 214. Other components may be included in the computing device 204. The arrangement of the computing device 204 is provided as an example, and is not intended to limit the scope of the invention. In alternative embodiments, instead of being coupled to an I/O port of the computing system, the probe-based storage device can be mounted onto the main circuit board of the computing system.

In the following description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of storing data in a storage device, comprising:
   providing a probe having a tip attached to the probe;
   forming a groove in a storage medium using the tip of the probe; and
   engaging the tip of the probe with a surface of the groove to store data,
   wherein the storage medium comprises first and second layers having different melting temperatures, the first layer disposed over the second layer, wherein a melting temperature of the first layer is greater than a melting temperature of the second layer, and wherein forming the groove in the surface of the storage medium comprises forming the groove to extend through the first layer.

2. The method of claim 1, further comprising forming a perturbation at a bottom surface of the groove using the tip of the probe, the bottom surface provided by the second layer.

3. The method of claim 1, further comprising flexibly attaching the tip to the probe to enable flexible engagement of the tip in the groove.

4. A storage device comprising:
a probe having a tip; and
a storage medium having a groove formed in the storage medium by the tip of the probe, the groove having a surface to interact with the tip of the probe to store data,
wherein the storage medium has at least a first layer and a second layer, the first layer disposed over the second layer, the groove extending through the first layer, the first and second layers having different melting temperatures, wherein a melting temperature of the first layer is higher than a melting temperature of the second layer.

5. The storage device of claim 1, wherein the tip of the probe is heatable and deflectable to create the groove.

6. The storage device of claim 1, further comprising a second probe having a tip, wherein the storage medium has a second groove formed in the storage medium by the tip of the second probe.

7. The storage device of claim 6, wherein the storage medium and the probes are moveable with respect to form the grooves.

8. The storage device of claim 7, wherein the grooves are generally parallel grooves.

9. The storage device of claim 4, wherein the tip of the probe is adapted to form a perturbation in the surface of the groove to represent a first state of a data bit.

10. The storage device of claim 9, wherein the perturbation comprises a dent.

11. The storage device of claim 10, wherein the tip of the probe is heatable to form the dent.

12. A system comprising:
a processor; and
a storage device comprising:
a probe having a tip; and
a storage medium having a surface, wherein the tip of the probe is adapted to form a track in the surface of the storage medium, the track having a surface to interact with the tip of the probe to store data,
wherein the tip of the probe is heatable to a first temperature to form the track, and wherein the tip of the probe is heatable to a second temperature less than the first temperature to form a perturbation in the surface of the track to represent a first state of a data bit,
wherein the storage medium has at least a first layer and a second layer, the first layer disposed over the second layer, the track extending through the first layer, the first layer having a melting temperature higher than a melting temperature of the second layer.

13. The system of claim 12, wherein the first temperature is greater than the melting temperature of the first layer, and the second temperature is greater than the melting temperature of the second layer but less than the melting temperature of the first layer.

14. The system of claim 12, wherein the first and second layers are formed of different materials with different melting temperatures.

15. The system of claim 12, wherein the first and second layers are formed of a first material, and the first material is treated differently in the first and second layers to provide different melting temperatures.

* * * * *

UNITED STATES PATENT AND TRADEMARK OFFICE
CERTIFICATE OF CORRECTION

| | | |
|---|---|---|
| PATENT NO. | : 7,215,633 B2 | Page 1 of 1 |
| APPLICATION NO. | : 10/640393 | |
| DATED | : May 8, 2007 | |
| INVENTOR(S) | : Todd C. Adelmann | |

It is certified that error appears in the above-identified patent and that said Letters Patent is hereby corrected as shown below:

In column 7, line 26, in Claim 5, delete "claim 1" and insert -- claim 4 --, therefor.

In column 7, line 28, in Claim 6, delete "claim 1" and insert -- claim 4 --, therefor.

Signed and Sealed this

Fourth Day of November, 2008

JON W. DUDAS
*Director of the United States Patent and Trademark Office*